(12) United States Patent
Walz et al.

(10) Patent No.: US 11,591,964 B2
(45) Date of Patent: Feb. 28, 2023

(54) OIL COOLING SYSTEM FOR AIRCRAFT ENGINE

(71) Applicant: PRATT & WHITNEY CANADA CORP., Longueuil (CA)

(72) Inventors: Andrew Walz, Toronto (CA); Ritchie Domingo, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/350,250

(22) Filed: Jun. 17, 2021

(65) Prior Publication Data

US 2022/0403779 A1 Dec. 22, 2022

(51) Int. Cl.
*F02C 7/14* (2006.01)
*F02C 7/06* (2006.01)

(52) U.S. Cl.
CPC .............. *F02C 7/14* (2013.01); *F02C 7/06* (2013.01); *F05D 2220/323* (2013.01); *F05D 2260/20* (2013.01)

(58) Field of Classification Search
CPC ........ F02C 7/14; F02C 7/06; F05D 2260/205; F05D 2260/20; F05D 2220/323; F16K 31/002
See application file for complete search history.

(56) References Cited

U.S. PATENT DOCUMENTS

| | | | |
|---|---|---|---|
| 4,498,525 A | 2/1985 | Smith | |
| 6,128,969 A * | 10/2000 | Litvin | F16H 1/125 244/17.11 |
| 6,422,020 B1 | 7/2002 | Rice | |
| 9,097,169 B2 | 8/2015 | Logan et al. | |
| 10,018,117 B2 | 7/2018 | Mottet et al. | |
| 10,208,669 B2 | 2/2019 | Gameiro et al. | |
| 10,508,598 B2 | 12/2019 | Weiner | |
| 10,900,422 B2 | 1/2021 | Logan et al. | |
| 2010/0186943 A1* | 7/2010 | Sun | F02C 7/14 165/299 |
| 2014/0223917 A1* | 8/2014 | Gameiro | F01D 25/18 60/772 |
| 2019/0063327 A1 | 2/2019 | Sekiguchi | |
| 2019/0107037 A1* | 4/2019 | Qiu | F01P 11/08 |

OTHER PUBLICATIONS

A. P. Kratz "Pressure Losses Resulting From Changes in Cross-Sectional Area in Air Ducts", University of Illinois Bulletin, 1938 p. 25-35, Chapter IV.*

* cited by examiner

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

An oil cooling system for an aircraft engine, a bypass valve and an associate method of cooling aircraft engine oil are provided. The oil cooling system includes a heat exchanger having an inlet and an outlet. The inlet is in fluid communication with a first oil conduit to receive a first oil flow from the first oil conduit. The heat exchanger facilitates heat transfer from the first oil flow to another fluid. A flow restrictor defining a constriction is operatively disposed to restrict the first oil flow through the heat exchanger. A second oil conduit receives the first oil flow from the heat exchanger. A bypass oil passage provides fluid communication between the first oil conduit and the second oil conduit to allow a second oil flow received from the first oil conduit to flow to the second oil conduit and bypass the heat exchanger.

20 Claims, 4 Drawing Sheets

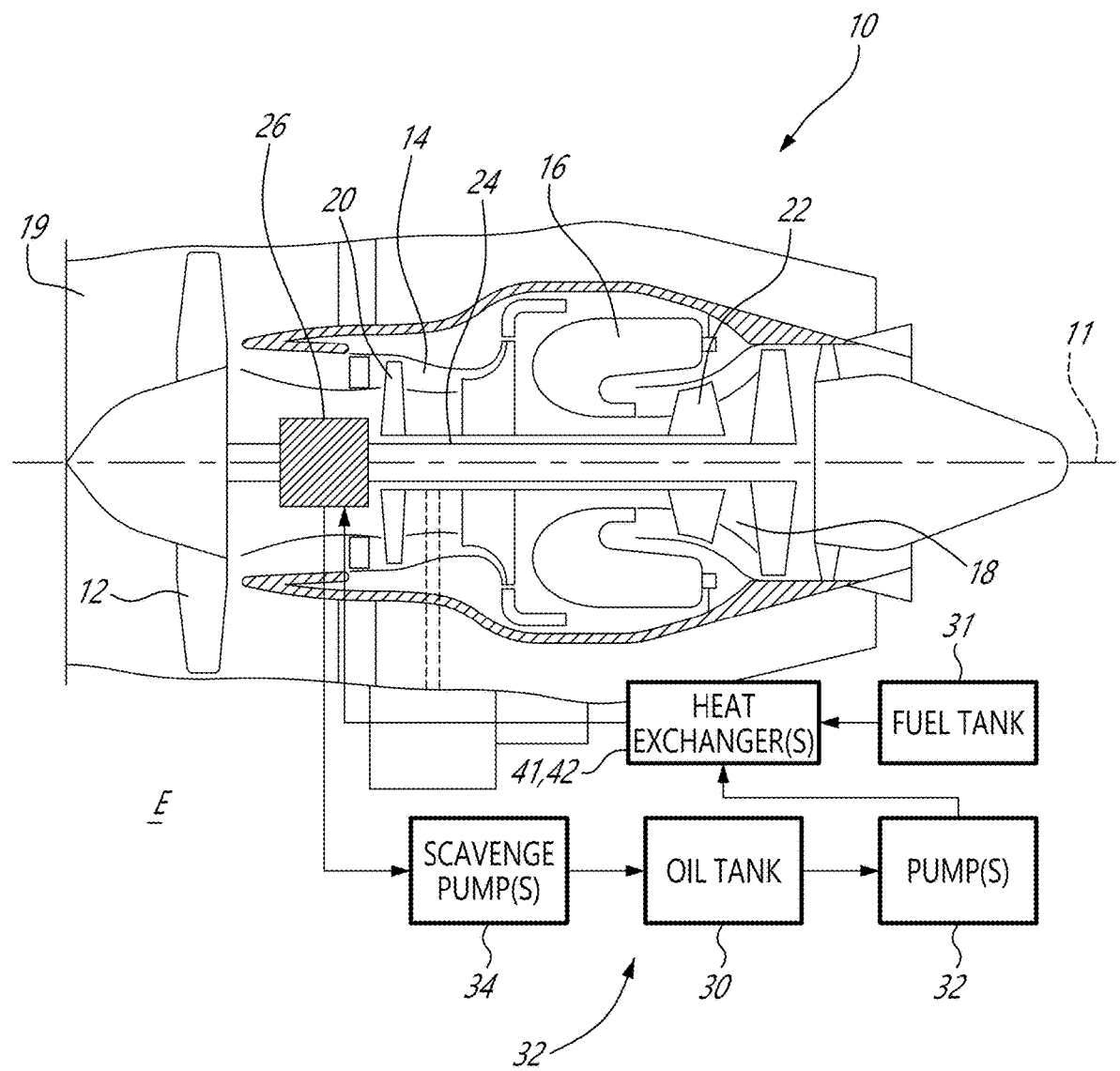

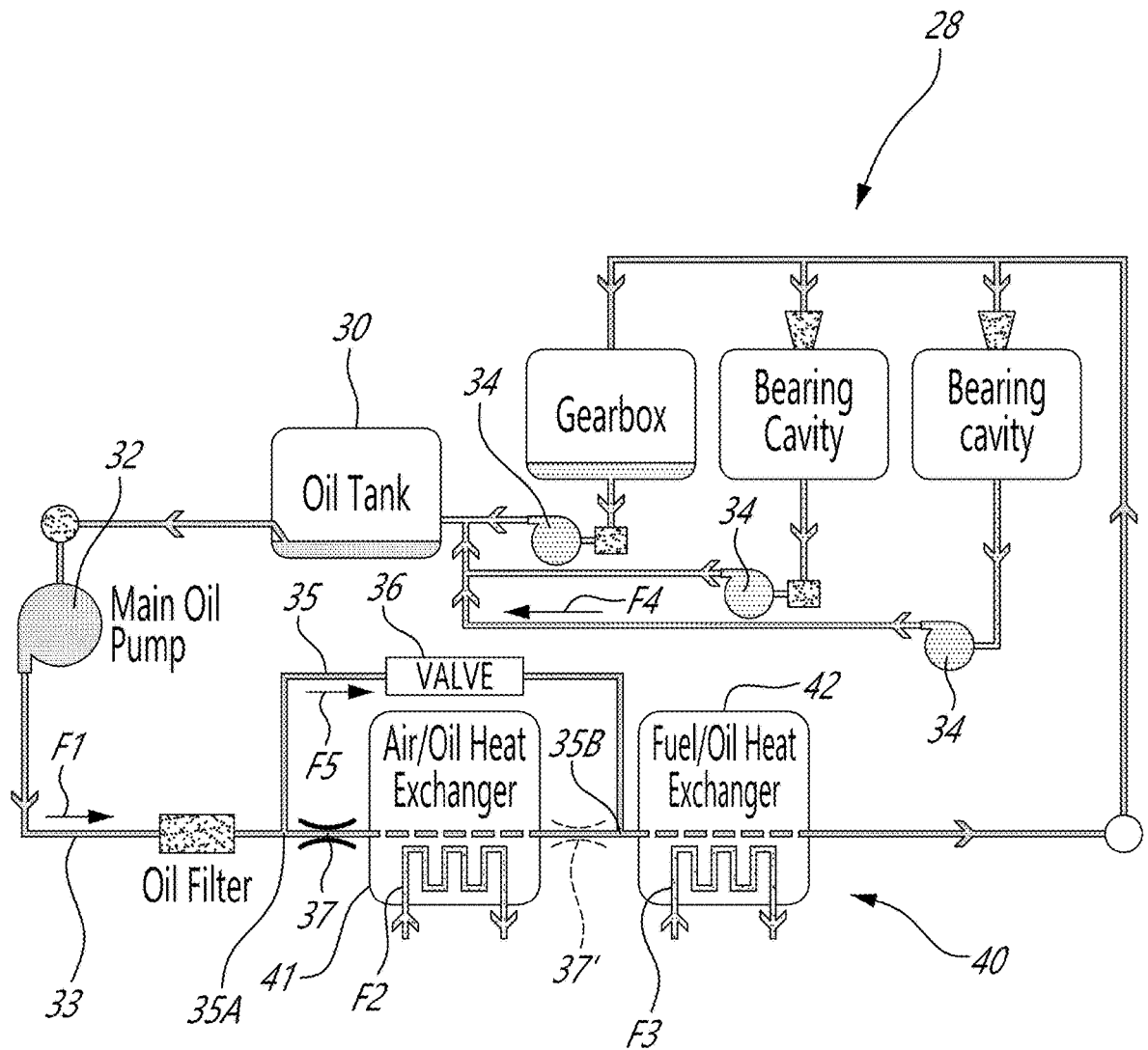

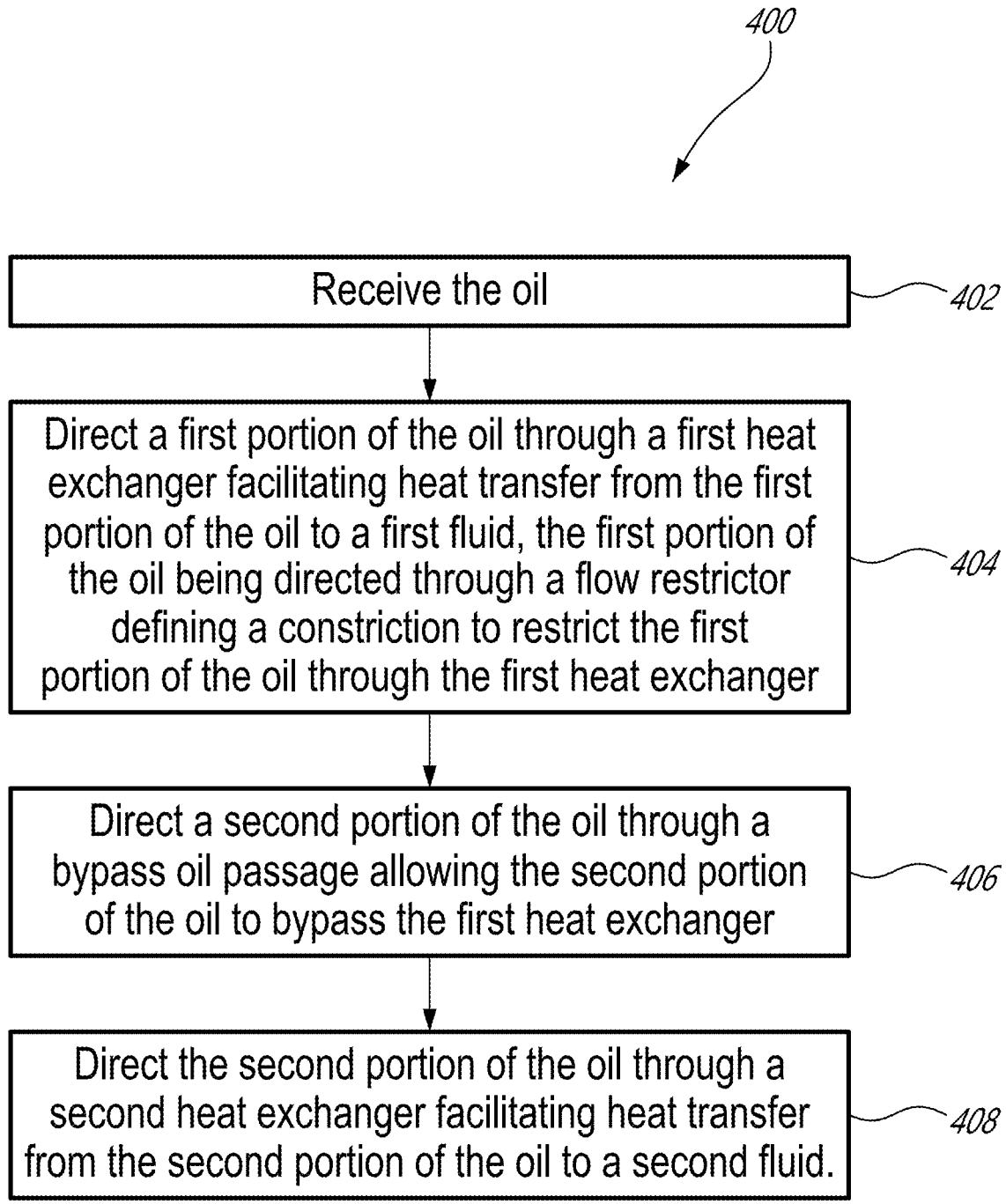

OIL COOLING SYSTEM FOR AIRCRAFT ENGINE

TECHNICAL FIELD

The application relates generally to aircraft engines and, more particularly, to lubrication systems of aircraft engines.

BACKGROUND OF THE ART

A typical aircraft engine has a lubrication system to meet the lubrication and cooling needs of various components of the engine. The lubrication system can deliver oil from an oil tank to the various components within the engine, recover the used oil from the components, and return the recovered used oil back to the oil tank for recirculation. Some aircraft engines can include one or more heat exchangers to remove heat from the oil. However, the cooling requirements can vary depending on the operating conditions of the aircraft engine. Providing oil cooling that can adapt to the operating conditions of the aircraft engine can affect cost, size, weight and complexity of a cooling system. Improvement is desirable.

SUMMARY

In one aspect, the disclosure describes an oil cooling system for an aircraft engine. The oil cooling system comprises:
a first oil conduit;
a heat exchanger having an inlet and an outlet, the inlet being in fluid communication with the first oil conduit to receive a first oil flow from the first oil conduit, the heat exchanger facilitating heat transfer from the first oil flow to a first fluid;
a flow restrictor defining a constriction and being operatively disposed to restrict the first oil flow through the heat exchanger;
a second oil conduit in fluid communication with the outlet of the heat exchanger to receive the first oil flow from the heat exchanger; and
a bypass providing fluid communication between the first oil conduit and the second oil conduit to allow a second oil flow received from the first oil conduit to bypass the heat exchanger and flow to the second oil conduit.

In another aspect, the disclosure describes a bypass valve for an oil cooling system of an aircraft engine. The bypass valve comprises:
a valve body defining:
a first oil passage extending from a first inlet to a first outlet,
a second oil passage extending from a second inlet to a second outlet, and
a bypass oil passage fluidly connecting the first oil passage to the second oil passage;
a valve member operable to control oil flow through the bypass oil passage; and
a flow restrictor defining a constriction and disposed inside the valve body either:
inside the first oil passage downstream of the bypass oil passage relative to the first inlet and the first outlet; or
inside the second oil passage upstream of the bypass oil passage relative to the second inlet and the second outlet.

In a further aspect, the disclosure describes a method of cooling oil of an aircraft engine. The method comprises:
receiving the oil;
directing a first portion of the oil through a first heat exchanger facilitating heat transfer from the first portion of the oil to a first fluid, the first portion of the oil being directed through a flow restrictor defining a constriction to restrict the first portion of the oil through the first heat exchanger;
directing a second portion of the oil through a bypass oil passage allowing the second portion of the oil to bypass the first heat exchanger; and
directing the second portion of the oil through a second heat exchanger facilitating heat transfer from the second portion of the oil to a second fluid.

Further details of these and other aspects of the subject matter of this application will be apparent from the detailed description included below and the drawings.

DESCRIPTION OF THE DRAWINGS

Reference is now made to the accompanying figures in which:

FIG. 1 is a schematic cross sectional view of an aircraft engine depicted as a gas turbine engine including an oil cooling system as described herein;

FIG. 2 is a schematic view of an exemplary oil cooling system of the aircraft engine of FIG. 1;

FIG. 4 is a flow chart illustrating a method of cooling oil of an aircraft engine.

DETAILED DESCRIPTION

Figure 3A:
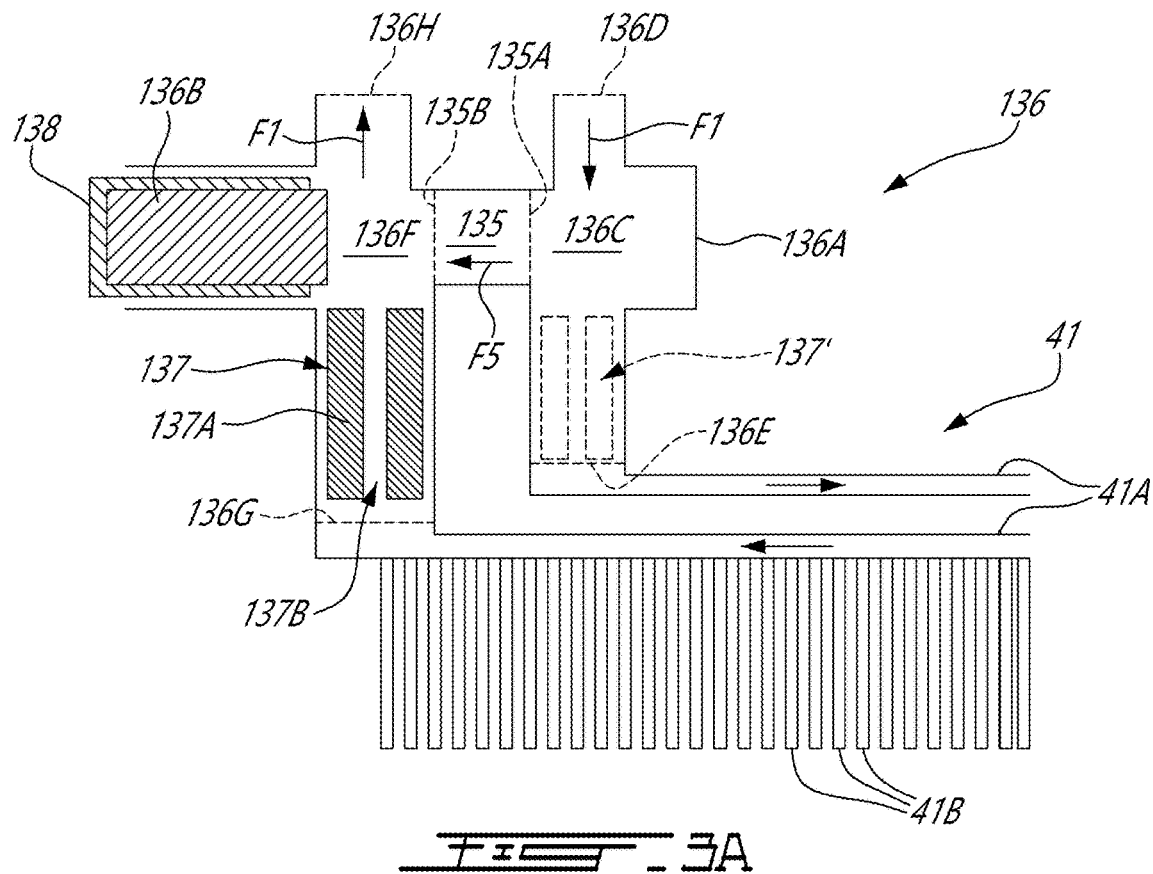
FIG. 3A is a schematic cross-sectional view of an exemplary bypass valve of the oil cooling system of FIG. 2 shown in an open configuration.

The following disclosure describes oil cooling systems, bypass valves and associated methods of cooling oil of aircraft engines. In some embodiments, the systems and methods described herein may provide an oil cooling approach that is at least partially adaptive to cooling needs in a relatively simple, compact and cost-effective manner. In some embodiments, the systems and methods described herein may facilitate ability to apportion the amount of heat rejection from the oil to air, and from the oil to fuel based on operating conditions. In some embodiments, the ability to control cooling of the oil may be performed in a relatively passive manner.

The terms "engaged" and "connected" may include both direct engagement or connection (in which two elements contact each other) and indirect engagement or connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. More specifically, the gas turbine engine 10 has a core gas path including an intake 19 for receiving air. The compressor section 14 has at least one compressor 20 extending across the core gas path and the turbine section 18 has at least one turbine 22 extending across the core gas path, with the at least one compressor 20 and the at least one turbine 22 being rotatable with a shaft 24 rotatably supported within the gas turbine engine 10 by bearings 26. An oil system 28 is provided for circulating oil to the bearings 26 and back to an oil tank 30. The oil system 28 may service one or more lubrication loads such as bearings and/or gears that require lubrication and/or cooling. It will be appreciated that the principles of the disclosure may apply to any aircraft engines, such as internal combustion engines (e.g., piston engine, rotary engine), any type of gas turbine engines, (e.g., turbofan, turboshaft, and turboprop), and auxiliary power units.

In the embodiment shown, the gas turbine engine 10 has a oil cooling system 40 that is used to exchange heat between different fluids for proper operation of the gas turbine engine 10. In the present case, the oil cooling system 40 includes a first heat exchanger 41, which may be referred to as a air-cooled oil cooler (ACOC), which is used to transfer heat from the oil to an environment E outside the gas turbine engine 10 via a bypass airflow flowing in an annular bypass duct of the gas turbine engine 10. As shown in FIG. 3A, the first heat exchanger 41 includes an oil conduit 41A and fins 41B. The heat from the oil may be transferred to the fins 41B by conduction and from the fins 41B to the environment E by convection. The oil cooling system 40 may further include a second heat exchanger 42, which may be referred to as a fuel-oil heat exchanger (FOHE), used for transferring heat from the oil of the oil system 28 to fuel flowing from a fuel tank 31, or any other fuel source, to the combustor 16 of the gas turbine engine 10 for combustion. Pre-heating the fuel as such may increase efficiency of the combustion of the fuel and may cool down the oil that heats up while lubricating the bearings 26 or other lubrication load(s).

Referring to FIG. 2, the oil system 28 and the oil cooling system 40 are shown in greater detail. The oil system 28 includes an oil pump 32 that drives an oil flow F1 within an oil conduit 33 from the oil tank 30. The oil flow F1 then exchanges heat with an airflow F2 through the first heat exchanger 41, and then exchanges heat with a fuel flow F3 through the second heat exchanger 42. The oil flow F1 is then distributed between different components (lubrication load(s)) in need of oil. In the present embodiment, the oil flow F1 is injected into bearing cavities and a gearbox. Used oil is then scavenged, and scavenge pump(s) 34 drive a scavenge oil flow F4 from scavenge outlets of the bearing cavities and the gearbox back to the oil tank 30 where the oil may be directed back to the oil pump 32 and recirculated. A de-oiler and/or de-aerator may be used to remove air from the scavenge oil flow F4.

The first heat exchanger 41 may be used to transfer heat from the oil flow F1 to the airflow F2. This may decrease a temperature of the oil flow F1. Then, the oil flow F1 may flow through the second heat exchanger 42 where it transfers additional heat to the fuel in order to cool the oil further. However, in some operating conditions of the gas turbine engine 10, for instance, when the gas turbine engine 10 is operating in cold operating conditions, heat may be transferred from the oil to the fuel to heat the fuel to about 32 Fahrenheit (0° C.) or higher. In some operating conditions, and more specifically when the gas turbine engine 10 is still warming up, the oil may not need to be cooled down with the air flow F2 before being directed through the second heat exchanger 42. Hence, it may be desired to direct at least some of the oil flow F1 (e.g., see flow F5) around the first heat exchanger 41 such that some of the oil flow F1 bypasses the first heat exchanger 41. Bypassing the first heat exchanger 41 may allow the oil to be at a higher temperature when it is injected in the second heat exchanger 42. Hence, more heat from the oil may be available to transfer to the fuel flow F3 when the first heat exchanger is bypassed.

Hence, a bypass 35 (i.e., bypass oil passage) may be connected to the oil conduit 33 at two connection points being respectively upstream and downstream of the first heat exchanger 41. In other words, the bypass 35 has a bypass inlet 35A fluidly connected to the oil conduit 33 upstream of the first heat exchanger 41 and a bypass outlet 35B fluidly connected to the oil conduit 33 downstream of the first heat exchanger 41 and upstream of the second heat exchanger 42. For example oil conduit 33 may have an upstream portion (i.e., first conduit) fluidly connected to an inlet of the first heat exchanger 41 and supply the first heat exchanger 41 with some of the oil from oil flow F1, and oil conduit 33 may have a downstream portion (i.e., second conduit) fluidly connected to an outlet of the first heat exchanger 41 and receive the oil that has been directed through the first heat exchanger 41. The bypass 35 may conduct a bypass oil flow F5 that corresponds to a portion of the oil flow F1 that bypasses the first heat exchanger 41. A bypass valve 36 may be fluidly connected to the bypass 35 and may be operable to control the flow of oil through bypass 35. The bypass valve 36 may be configurable between an open configuration and a closed configuration to selectively open or close the bypass 35. The bypass valve 36 may be in the open configuration during relatively cold operating conditions of the gas turbine engine 10 to preserve heat from the oil to be preferably transferred to the fuel instead of the air.

However, in some embodiments, a pressure differential is provided along the bypass 35 such that even when the bypass valve 36 is in the open configuration, some oil of the oil flow F1 may flow through the first heat exchanger 41. In some cases, it may be desirable to increase the bypass flow F5 to increase a temperature of the oil that is being directed through the second heat exchanger 42. One solution may be to increase a dimension (e.g., diameter) of the bypass 35 to reduce the resistance to flow through bypass 35. However, doing so may require a bigger bypass 35 and a bigger bypass valve 36, which may add weight and size to the system.

In the embodiment shown, a flow restrictor 37 is used to promote the flow of oil through the bypass 35 instead of through the first heat exchanger 41 in some situations. In other words, the flow restrictor 37 may increase a resistance to the oil flow F1 across the first heat exchanger 41. The oil may naturally tend to use the path of least resistance and more oil may flow through the bypass 35 rather than across the first heat exchanger 41 in some situations. The flow restrictor 37 may define a constriction (i.e., narrowing or reduced cross-sectional area of the available flow passage). The flow restrictor 37 may include a single orifice or a plurality of orifices (referred hereinafter in the singular) sized (e.g., calibrated) to increase resistance to flow and provide desired flow conditions in some situations. In some embodiments, the flow restrictor 37 may include a perforated body.

The orifice may cause a decrease in flow-receiving area of the oil conduit 33 such that more oil flows through the bypass 35. Moreover, when cold, the oil may be more viscous. This may further increase the flow resistance of the oil across the flow restrictor 37. When the oil warms up and when the gas turbine engine 10 is in a cruise operating condition for example, the oil may be less viscous and the oil may flow through the flow restrictor 37 more easily with less resistance than when the oil is cold. The orifice of the flow restrictor 37 may be sized such that it discourages the oil from flowing through the first heat exchanger 41 when the oil is cold and such that it may not increase substantially a pressure differential across the flow restrictor 37 when the oil is at its nominal temperature. The nominal temperature refers to the temperature of the oil when the engine 10 is in a cruise operating condition for example.

In the depicted embodiment, the flow restrictor 37 is in fluid flow communication with the oil conduit 33. The flow restrictor 37 may be located outside the bypass 35. The flow restrictor 37 may be located downstream of the bypass inlet 35A relative to the oil flow F1 in the oil conduit 33, and upstream of the bypass outlet 35B. The flow restrictor 37 may be located upstream, downstream or inside of the first heat exchanger 41. In FIG. 2, the flow restrictor 37 is located between the bypass inlet 35A and the first heat exchanger 41. An alternate position is shown with dashed lines and shows the flow restrictor 37' between the first heat exchanger 41 and the bypass outlet 35B.

In use, when the bypass valve 36 is in the open configuration and allows the bypass flow F5 to flow in the bypass 35, an increased mass flow rate of oil may flow in the bypass 35 instead of through the first heat exchanger 41 compared to a configuration lacking the flow restrictor 37. Hence, a temperature of the oil in the oil conduit 33 at an intersection with the bypass outlet 35B may, in some situations, be greater thanks to the flow restrictor 37. This may result in more heat being available for transfer from the oil to the fuel via the second heat exchanger 42 since less heat from the oil is rejected via the first heat exchanger 41.

Figure 3B:
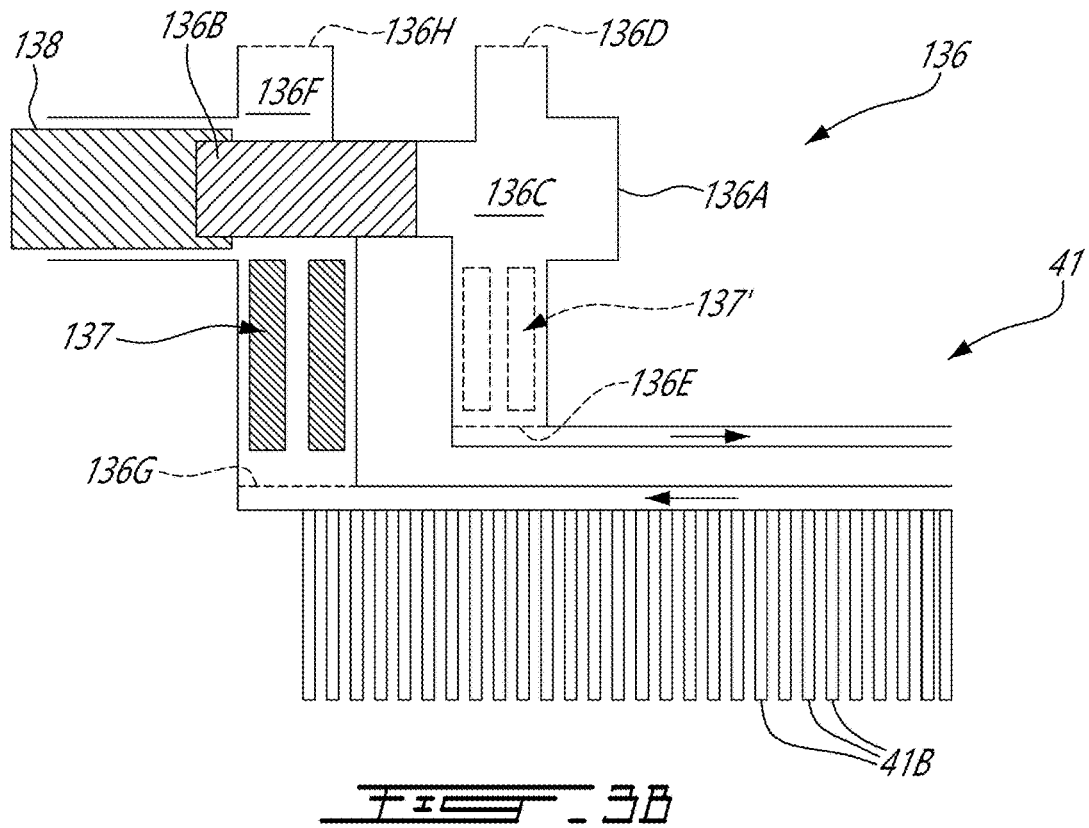
FIG. 3B is a schematic cross-sectional view of the bypass valve of FIG. 3A shown in a closed configuration.

Referring now to FIGS. 3A and 3B, an alternate implementation of the flow restrictor is illustrated. In the embodiment shown, one or more flow restrictors 137 may be incorporated into a bypass valve 136. The bypass valve 136 may have a valve body 136A and a valve member 136B that is movable relative to the valve body 136A. The valve body 136A may define a first oil passage 136C extending from a first valve inlet 136D, which is fluidly connected to the oil conduit 33, to a first valve outlet 136E fluidly connected to an oil conduit 41A of the first heat exchanger 41. The valve body 136A may have a second oil passage 136F extending from a second valve inlet 136G, which is fluidly connected to the oil conduit 41A of the first heat exchanger 41, to a second valve outlet 136H, which is fluidly connected to the oil conduit 33 upstream of the second heat exchanger 42.

The bypass valve 136 may include a bypass 135 that connects the first oil passage 136C to the second oil passage 136F. As shown, the bypass 135 may have a bypass inlet 135A and a bypass outlet 135B. The bypass inlet 135A is fluidly connected to the first oil passage 136C downstream of the first valve inlet 136D relative to the oil flow F1 and upstream of the first valve inlet 136D. The bypass outlet 135B may be fluidly connected to the second oil passage 136F downstream of the second valve inlet 136G and upstream of the second valve outlet 136H.

As shown in FIG. 3B, the valve member 136B may extend into the second oil passage 136F when the valve member 136B obstructs the bypass 135. It will be appreciated that the valve member 136B may be dimensioned such as to not excessively obstruct the oil flow through the second oil passage 136F. The valve member 136B may include a shank and a head of a greater diameter than the shank. The head may be sized to open and close the bypass 135. The head may abut a seat located proximate or inside the bypass 135 to block the oil from flowing through the bypass 135. In some cases, the valve member 136B may be provided in the form of a gate that is movable transversally relative to the bypass 135, like a guillotine, to close the bypass 135.

The valve member 136B may be movable relative to the valve body 136A from a first position corresponding to the open configuration of the bypass valve 136 to a second position corresponding to the closed configuration of the bypass valve 136. The valve member 136B may also be movable to intermediate positions between the open and closed configurations. As shown in FIG. 3A, the valve member 136B may be outside the bypass 135 in the first position. As shown in FIG. 3B, the valve member 136B may be occluding the bypass 135 in the second position. In FIG. 3A, a bypass flow F5 is allowed and a portion of the oil flow F1 bypasses the first heat exchanger 41 and flows from the first valve inlet 136D to the second valve outlet 136H without flowing in the oil conduit 41A of the first heat exchanger 41. In FIG. 3B, the valve member 136B blocks the bypass 135 and the oil flow F1 is forced to flow through the first heat exchanger 41 to transfer a portion of its heat to the air flow F2 (FIG. 2).

In the embodiment shown, the flow restrictor 137 is disposed in the second oil passage 136F downstream of the second valve inlet 136G and upstream of the bypass outlet 135B. Alternatively, the flow restrictor 137' may be located in the first oil passage 136C downstream of the bypass inlet 135A and upstream of the first valve outlet 136E. The flow restrictor 137 may be disposed outside of the bypass 135. It will be appreciated that, in another embodiment, the flow restrictor 137 may be located in the oil conduit 41A of the first heat exchanger 41.

In the embodiment shown, the flow restrictor 137 is an annular member 137A defining a central passage 137B. The flow restrictor 137 may decrease a flow-receiving area of the second oil passage 136F (or of the first oil passage 136C) by any amount suitable to achieve the desired thermal management within the oil system 28. In some applications, the flow restrictor 137 may decrease a flow-receiving area of the second oil passage 136F (or of the first oil passage 136C) by at least 50% for example. In some applications, the flow restrictor 137 may decrease a flow-receiving area of the second oil passage 136F (or of the first oil passage 136C) by about 90% for example. In some applications, the flow restrictor 137 may decrease a flow-receiving area of the second oil passage 136F (or of the first oil passage 136C) by between 50% to 95% for example.

The orifice of the flow restrictor 137 may have any suitable cross-sectional shape, such as circular, elliptical, rectangular and square for example. The orifice of the flow restrictor 137 may tapered to have a conical shape. The flow restrictor 137 may be devoid of any moving part. The flow restrictor 137 may alternatively be a plate/screen with one or more orifices therethrough. Various types of flow restrictors may be suitable. The flow restrictor 137 may be a separate piece (body) inserted in the valve body 136A or in the oil conduit 41A of the first heat exchanger 41. For example, the flow restrictor 137 may be a perforated body that is installed inside of the valve body 136A. Alternatively, the flow restrictor 137 may include a constriction defined by (e.g., integrally formed with, having a unitary construction with) the first or second oil passages of the valve body 136A or by the oil conduit 41A of the first heat exchanger 41.

A dimension of the central passage or orifice (or sizing of a group of orifices) of the flow restrictor 137 may be selected to significantly reduce oil flow through the first heat exchanger 41 specifically during cold day operation when oil viscosity and a small restriction adds significantly higher pressure differential, thereby forcing more oil through the bypass 35, 135 to reduce heat rejection to the air flow F2 (FIG. 2) through the first heat exchanger 41 and increase oil heat available to transfer to fuel. Use of the flow restrictor 137 may add little weight to the design without the need to increase bypass valve and valve body size or increase the pressure differential of the first heat exchanger 41 itself.

At very low temperatures the oil residing in the first heat exchanger 41 may be relatively viscous. In order to decongeal this oil mass, a minimum amount of heat may be required while the bypass valve 36 is open. This minimum amount of heat available for decongealing the oil residing in the first heat exchanger 41 may be determined by the flow split between the first heat exchanger 41 and the bypass 35. The flow restrictor 137 may be designed based on an oil decongealing margin to passively control the heat rejection from the oil to the bypass air where basic geometry, form factor, aerodynamic concerns and/or the installed configuration typically do not facilitate such optimization.

Still referring to FIGS. 3A and 3B, the valve member 136B may be engaged by an actuator, such as a linear actuator 138. The valve member 136B may be a movable part of an actuator. For example, the valve member 136B may be part of a self-regulating thermostatic valve. The linear actuator 138 may be a wax actuator that expands and contracts as a function of temperature. That is, the linear actuator 138 may not need to be actively control by a controller and may automatically expand and contract with the temperature of the oil. In the present case, the bypass valve 136 may be in the open configuration when a temperature of the oil flow is below a first temperature threshold and in the closed configuration when the temperature of the oil flow is above a second temperature threshold. In some embodiments, the first and second temperature thresholds may correspond to about 195 Fahrenheit. The valve member 136B may be moved from the second position depicted in FIG. 3B where it blocks the bypass 135 to the first position depicted in FIG. 3A where it is offset from the bypass 135 when the temperature is below 195 Fahrenheit for example.

It will be appreciated that, in an alternate embodiment, the linear actuator 138 may be operatively connected to a controller that receives a signal from a sensor; the signal indicative of a temperature and/or a pressure of the oil. In such cases, the actuator may be a solenoid, a pneumatic actuator, a hydraulic actuator, or any other suitable actuator. The controller may therefore control the opening and closing of the bypass 135 as a function of the temperature of the oil.

Referring now to FIG. 4, a flow chart illustrates a method 400 for cooling oil of the oil system 28. Aspects of method 400 may be combined with other aspects or actions disclosed herein. Aspects of system 28 may be incorporated into method 400. In various embodiments, the method 400 may include receiving the oil at 402, directing a first portion of the oil through the first heat exchanger 41 for facilitating heat transfer from the first portion of the oil to a first fluid, the first portion of the oil being directed through the flow restrictor 37, 137 defining a constriction to restrict the first portion of the oil through the first heat exchanger 41 at 404; directing a second portion of the oil through the bypass oil passage 35 allowing the second portion of the oil to bypass the first heat exchanger 41 at 406; and directing the second portion of the oil through the second heat exchanger 42 facilitating heat transfer from the second portion of the oil to a second fluid at 408.

The first fluid may be air and the second fluid may be fuel. However, it is understood that in some embodiments, the first fluid may be fuel and the second fluid may be air. In some embodiments, both fluids may be of the same type (e.g., both air or both fuel). Other fluids may also be used to cool the oil. The method 400 may include directing the first portion of the oil through the second heat exchanger 42. The flow restrictor 37, 137 may be disposed upstream of the first heat exchanger 41 relative to a flow of the first portion of the oil through the first heat exchanger 41. The flow restrictor 37, 137 may be disposed downstream of the first heat exchanger 41 relative to the flow of the first portion of the oil through the first heat exchanger 41.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An oil cooling system for an aircraft engine, the oil cooling system comprising:
   a first oil conduit;
   a heat exchanger having an inlet and an outlet, the inlet being in fluid communication with the first oil conduit to receive a first oil flow from the first oil conduit, the heat exchanger facilitating heat transfer from the first oil flow to a first fluid;
   a flow restrictor defining a constriction and being operatively disposed to restrict the first oil flow through the heat exchanger, the flow restrictor being disposed inside a passage, the flow restrictor defining a reduction of at least 50% in flow-receiving cross-sectional area relative to the passage, the flow restrictor being sized to not substantially increase a pressure differential across the flow restrictor when oil of the first oil flow is at a nominal temperature corresponding to a cruise operating condition of the aircraft engine;
   a second oil conduit in fluid communication with the outlet of the heat exchanger to receive the first oil flow from the heat exchanger;
   a bypass providing fluid communication between the first oil conduit and the second oil conduit to allow a second oil flow received from the first oil conduit to bypass the heat exchanger and flow to the second oil conduit; and
   a valve controlling an oil flow split between the heat exchanger and the bypass, the valve being configurable:
      in an open configuration in which the bypass is open and the first oil flow is permitted through the heat exchanger and through the flow restrictor; and
      in a closed configuration in which the bypass is closed and the first oil flow is permitted through the heat exchanger and through the flow restrictor.

2. The oil cooling system as defined in claim 1, wherein:
   the heat exchanger is a first heat exchanger facilitating heat transfer from the first oil flow to air; and
   the oil cooling system includes a second heat exchanger downstream of the first heat exchanger to facilitate heat transfer from oil received from the second oil conduit to fuel.

3. The oil cooling system as defined in claim 1, wherein the valve is a thermostatic valve.

4. The oil cooling system as defined in claim 1, wherein the valve includes a valve body defining the passage establishing fluid communication between the first oil conduit and the inlet of the heat exchanger.

5. The oil cooling system as defined in claim 4, wherein the flow restrictor includes a perforated body installed inside the passage.

6. The oil cooling system as defined in claim 1, wherein the valve includes a valve body defining a passage establishing fluid communication between the outlet of the heat exchanger and the second oil conduit.

7. The oil cooling system as defined in claim 6, wherein the flow restrictor includes a perforated body installed inside the passage.

8. The oil cooling system as defined in claim 1, wherein the flow restrictor includes a perforated body installed inside the passage.

9. The oil cooling system as defined in claim 1, wherein:
the passage is defined in a valve body; and
the flow restrictor is piece separate from the valve body that is inserted inside the passage.

10. A bypass valve for an oil cooling system of an aircraft engine, the bypass valve comprising:
a valve body defining:
a first oil passage extending from a first inlet to a first outlet,
a second oil passage extending from a second inlet to a second outlet, and
a bypass oil passage fluidly connecting the first oil passage to the second oil passage;
a valve member operable to control oil flow through the bypass oil passage; and
a flow restrictor defining a constriction and disposed inside the valve body either:
inside the first oil passage downstream of the bypass oil passage relative to the first inlet and the first outlet; or
inside the second oil passage upstream of the bypass oil passage relative to the second inlet and the second outlet,
wherein the flow restrictor is sized to not substantially increase a pressure differential across the flow restrictor when the oil is at a nominal temperature corresponding to a cruise operating condition of the aircraft engine.

11. The bypass valve as defined in claim 10, wherein the flow restrictor includes a perforated body installed inside the first or second oil passages.

12. The bypass valve as defined in claim 11, wherein the flow restrictor is disposed inside the second oil passage.

13. The bypass valve as defined in claim 10, wherein the flow restrictor is disposed inside the first oil passage.

14. The bypass valve as defined in claim 10, wherein the valve member is part of a self-regulating thermostatic valve.

15. The bypass valve as defined in claim 10, wherein the flow restrictor defining a reduction of at least 50% in flow-receiving cross-sectional area relative to the first oil passage.

16. A method of cooling oil of an aircraft engine, the method comprising:
receiving the oil;
apportioning the oil into a first portion of the oil and a second portion of the oil based on an operating condition of the aircraft engine;
directing the first portion of the oil through a first heat exchanger facilitating heat transfer from the first portion of the oil to a first fluid, the first portion of the oil being directed through a flow restrictor defining a constriction to restrict the first portion of the oil through the first heat exchanger, the flow restrictor being disposed inside a first oil passage, the flow restrictor being sized to not substantially increase a pressure differential across the flow restrictor when the oil is at a nominal temperature corresponding to a cruise operating condition of the aircraft engine;
directing the second portion of the oil through a bypass oil passage while the first portion of the oil is directed through the first heat exchanger and through the flow restrictor, the bypass oil passage allowing the second portion of the oil to bypass the first heat exchanger; and
directing the second portion of the oil through a second heat exchanger facilitating heat transfer from the second portion of the oil to a second fluid.

17. The method as defined in claim 16, wherein the first fluid is air and the second fluid is fuel.

18. The method as defined in claim 17, comprising directing the first portion of the oil through the second heat exchanger.

19. The method as defined in claim 16, wherein the flow restrictor is disposed upstream of the first heat exchanger relative to a flow of the first portion of the oil through the first heat exchanger.

20. The method as defined in claim 16, wherein the flow restrictor is disposed downstream of the first heat exchanger relative to a flow of the first portion of the oil through the first heat exchanger.

* * * * *